United States Patent [19]

Wade

[11] Patent Number: 5,449,084
[45] Date of Patent: Sep. 12, 1995

[54] GAUGE POLE SEAL

[76] Inventor: Lewis Wade, 3954 Cordova Ave., Jacksonville, Fla. 32207

[21] Appl. No.: 309,940

[22] Filed: Sep. 21, 1994

[51] Int. Cl.⁶ .................... B65D 88/32; B65D 88/40
[52] U.S. Cl. ................................ 220/216; 220/220
[58] Field of Search ............ 220/216, 220, 219; 385/373, 415, 419, 206, 208, 210, 2.5; 33/705; 73/322.5; 92/165 R, 168

[56] References Cited

U.S. PATENT DOCUMENTS

| | | | |
|---|---|---|---|
| 3,319,329 | 5/1967 | Knutsen et al. | 220/220 X |
| 3,409,165 | 11/1968 | Creith | 220/216 |
| 3,771,820 | 11/1973 | Hoss, Sr. et al. | 285/373 |
| 4,243,151 | 1/1981 | Bruening | 220/216 |
| 4,260,068 | 4/1981 | McCarthy et al. | 220/221 |
| 4,332,404 | 1/1982 | Huffman | 285/373 X |
| 4,557,509 | 10/1985 | Giebeler | 285/419 X |
| 4,865,357 | 9/1989 | Brinegar | 285/373 X |
| 5,007,666 | 4/1991 | Kyfes | 285/373 |
| 5,353,941 | 10/1994 | Benuegnu et al. | 220/216 X |

Primary Examiner—Allan N. Shoap
Assistant Examiner—Nathan J. Newhouse
Attorney, Agent, or Firm—Thomas C. Saitta

[57] ABSTRACT

A seal for use in large liquid storage tanks having a floating roof and fixed, slotted gauge pole vertically extending through a well with a sliding cover is disclosed, the seal comprising two half sleeve members joined to form a tubular sleeve surrounding the gauge pole within the well of the floating roof, means to join the two half sleeve members together, and a sealing collar and gasket which seals the aperture in the sliding cover and connects the sleeve to the sliding cover of the well. The seal sleeve member extends from above the roof through the well and down into the liquid, thereby closing all the exposed slots on the gauge pole.

5 Claims, 2 Drawing Sheets

GAUGE POLE SEAL

BACKGROUND OF THE INVENTION

This invention relates generally to the field of seals to prevent loss of vaporized liquids from a container. More particularly, the invention relates to the field of seals utilized to prevent vapor loss from large storage tanks. Even more particularly, the invention relates to the field of seals used to prevent vapor loss in large storage tanks having slotted gauge poles for measuring and sampling the stored liquid.

Many liquids, including volatile liquids such as gasoline or oil, are stored in large bulk storage tanks or containers. These storage tanks are sized to hold millions of gallons of liquid. It is very important, from both an economical and an environmental perspective, to minimize the loss of liquid through vaporization. Obviously, the simplest solution was to provide the tanks with a cover or roof. A fixed roof, however, allowed for the build-up of vapors within the tank as the level of liquid was lowered, leading to a dangerous situation when the liquids stored were flammable or explosive in vapor form. This led to the development of tanks having floating roofs which move vertically in relation to the height of the liquid in the tank, thereby eliminating the air gap between liquid surface and roof. Such structures still require access means to measure or sample the liquid, the access means being relatively small diameter wells positioned in the roof through which fixed gauge poles extend vertically. The gauge poles are slotted along their length to allow the liquid to enter their interior, where a sample could be drawn by lowering a small device into the gauge pole from on top of the roof. The wells, however, allow for air to liquid contact, which allows vaporization and loss of liquid. A sliding well cover, with a small aperture surrounding the gauge pole, is used to seal off the well, but there is still a significant amount of vapor loss, even if a floating seal is positioned in the interior of the slotted gauge pole. For example, in a tank with a capacity of 2,600,000 gallons of gasoline, there is an average loss of about 8,000 gallons of gasoline per year by vaporization escape to the atmosphere through a gauge pole with a floating internal seal and the sliding cover.

It is an object of this invention to provide an apparatus which prevents loss of vaporized liquid through the gauge pole and sliding cover. It is a further object to provide such an apparatus which does not interfere with the workings of either the gauge pole, sliding cover or floating roof. It is a further object to provide such an apparatus which can be installed easily in existing tank structures.

SUMMARY OF THE INVENTION

The invention comprises a seal adapted for use with large liquid storage containers having a floating roof and a gauge pole (also called a gauge pipe or gauge tube) used to store large quantities of volatile liquids such as oil, gasoline or the like. The gauge pole allows for easy direct access to the liquid contents for sampling, measuring, etc., and typically has a number of access slots cut into its wall. The floating roof rests on the surface of the liquid and rises and falls with the change in the amount of liquid stored in the container, thereby minimizing the amount of air between the roof and the surface of the liquid to preclude product loss and the build-up of dangerous gases through evaporation of the liquid. The gauge pole is fixed and the floating roof moves vertically relative to the gauge pole, which is usually positioned off-center to prevent rotation of the floating roof within the circular storage container. The gauge pole extends through the well of the floating roof and through an aperture in the roof plate or sliding plate, so provision must be made for a seal to prevent evaporative loss of liquid into the atmosphere through the gauge pole itself and through the aperture surrounding the gauge pole.

The invention comprises two mating half-sleeve members, generally semi-circular in cross-section, which are connected around the gauge pole to form a tubular sleeve. This sleeve is of greater length than the depth of the floating roof, such that the lower end extends into the liquid itself and the upper end extends above the top of the floating roof and the sliding plate. The two half-sleeves are preferably held together by a band spring or other suitable mechanical fasteners which allow the half-sleeves to be easily joined around the gauge pole and slid down into the well of the floating roof through the sliding plate aperture. The sleeve has a sealing collar which rests on the top of the sliding plate, the collar preferably having an annular gasket to better seal the joint between the two. The sleeve is affixed to the sliding plate by the combination of spring tabs which create a flange on the underside of the sliding plate and adjustable mechanical fasteners, such as locking screws, mounted on the sleeve above the sliding plate. By tightening the screws, the sealing collar is pressed tightly against the sliding plate and the sleeve is rigidly attached to the sliding plate. Preferably the upper and lower ends of the sleeve are flared outwardly to allow the sleeve to pass over imperfections on the exterior of the gauge pole as the floating roof and sleeve move vertically relative to the gauge pole.

The invention thus prevents evaporative loss of the liquid from the well of the floating roof by sealing the two main avenues of escape—the gap between the sliding plate and the gauge pole and the gauge pole slots exposed in the well of the floating roof. The solid tubular sleeve extending into the liquid closes all the exposed slots, and the sealing collar closes the gap.

DETAILED DESCRIPTION OF THE INVENTION

Figure 1:
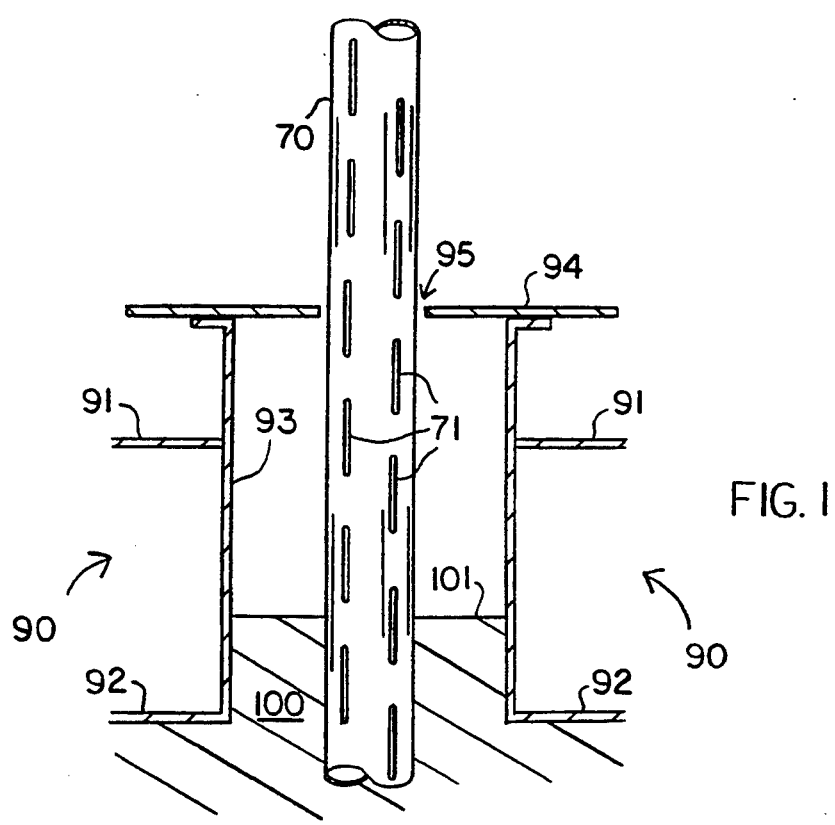
FIG. 1 is a view of the typical construction of a floating roof and gauge pole combination, with the floating roof shown in cross-section and the gauge pole shown exposed.

With reference now to the drawings, the invention will be described in detail with presentation of the best mode and preferred embodiment. The invention is for use in very large liquid storage tanks, usually circular, which have floating roofs and a fixed gauge pole (also known as a guide pole or tube) which is used to provide access means through the roof for sampling, testing or measuring of the liquid within the tank. Such structures are commonly used for the storage of large quantities of gasoline, oil or chemicals. The tanks incorporate a floating roof to minimize vaporization of the liquid, both to prevent loss to the atmosphere and to prevent build-up of hazardous vapors within the storage tank itself. In the case of the liquids mentioned above, such vapors can be hazardous to human health and the environment, and can be highly explosive in the vapor state. A typical configuration is illustrated in FIG. 1, where a section of the floating roof 90 is shown in cross-section. Floating roof 90 comprises an upper roof surface 91 which is exposed to the atmosphere and a lower roof surface 92 which rests submerged in the liquid 100, such that the liquid surface 101 lies between the two roof surfaces. As the liquid surface 101 rises or falls with addition or removal of liquid 100 from the tank, floating roof 90 rises or falls in conjunction, such that there is no air gap between the liquid surface 101 and the lower roof surface 92 where vapors can form and collect.

Figure 4:
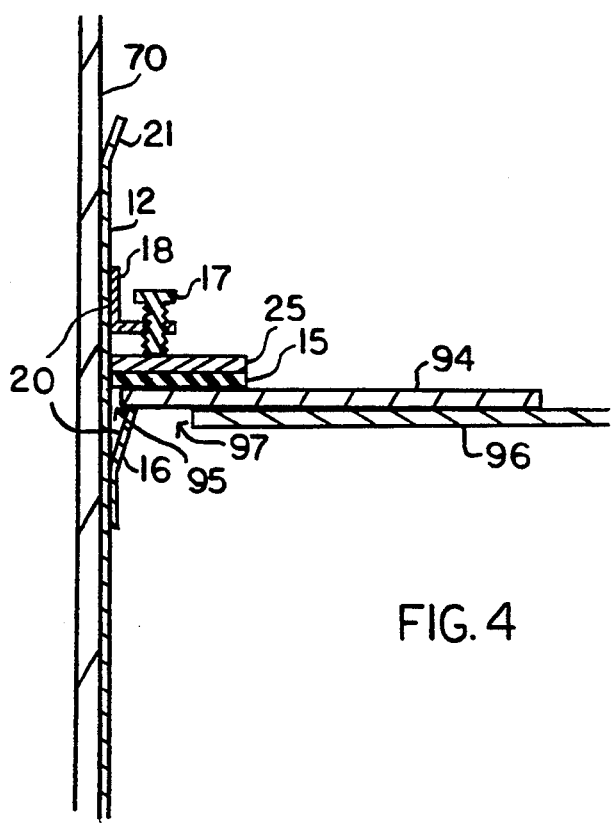
FIG. 4 is a cross-sectional view of the sealing collar and mechanism for attaching the sleeve to the sliding panel.

A gauge pole 70 is mounted onto the tank and extends vertically out through the floating roof 90. The gauge pole 70 has a number of slots or apertures 71 positioned along its entire length, the slots 71 allowing the liquid 100 to flow into the interior of the gauge pole 70 and providing means for testing of the liquid 100 at any depth. A well 93 is formed into floating roof 90 to provide an opening for the gauge pole 70. The well 93 is typically much larger in diameter than the gauge pole 70 to allow for shifting of the floating roof 90 during its vertical movement. Typically the gauge pole 70 and well 93 is positioned off-center so that the gauge pole 70 acts to prevent rotation of the floating roof 90. Because the well 93 is much wider than the gauge pole 70, a sliding cover 94 with an aperture 95 adapted to more closely encircle the gauge pole 70 is typically utilized to close the large opening to prevent vapor loss from the liquid surface 101 through the well 93 and into the atmosphere. As shown in FIG. 4, usually two plates are used to close the well 93, the sliding cover 94 and a roof plate 96 attached to the well 93, where the roof plate aperture 97 is slotted to allow for some lateral movement of the roof 90 as it moves vertically. The sliding cover 94 moves freely of the roof plate 96 and, since it does not need to cover the entire well 93, can be smaller in overall dimension. With either type of structure however, there is still excessive vapor loss through the gap between the gauge pole 70 and the sliding cover aperture 95 and the roof plate aperture 97. In addition to this source of vapor loss, the standard tank constructions provide a second source of vapor loss through the interior of the gauge pole 70 because of the gauge pole slots 71 themselves. The relatively large diameter of the well 93 in the floating roof 90 allows for liquid-air contact outside the gauge pole 70, which results in vaporization of the liquid 100. External winds blowing across the floating roof 90 draw the vapor through the slots 71 and out the gauge pole 70 into the atmosphere, as well as increasing loss around the gauge pole 70.

Figure 2:
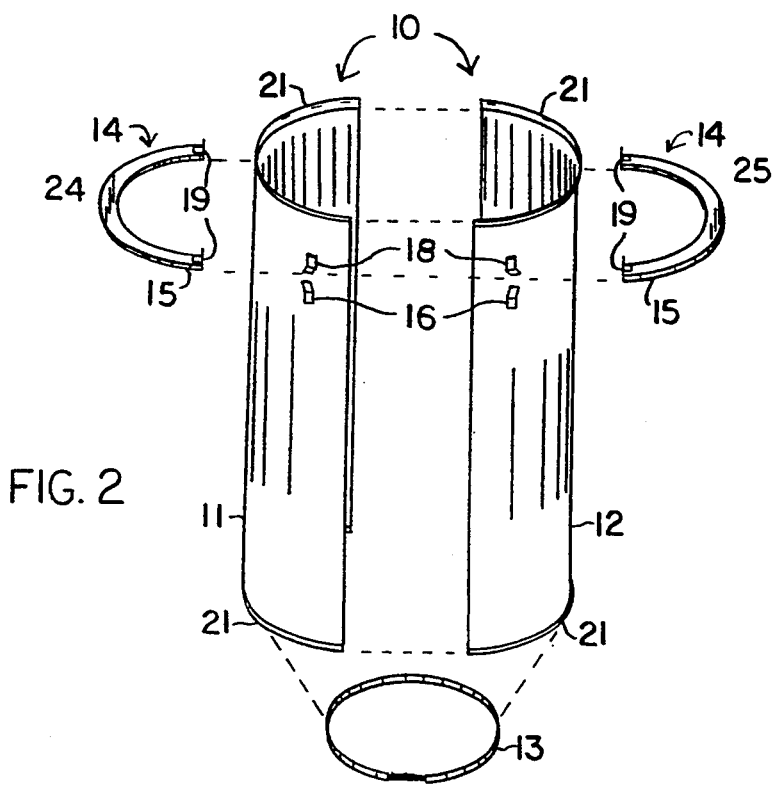
FIG. 2 is an exploded view of the invention showing the various elements.
Figure 3:
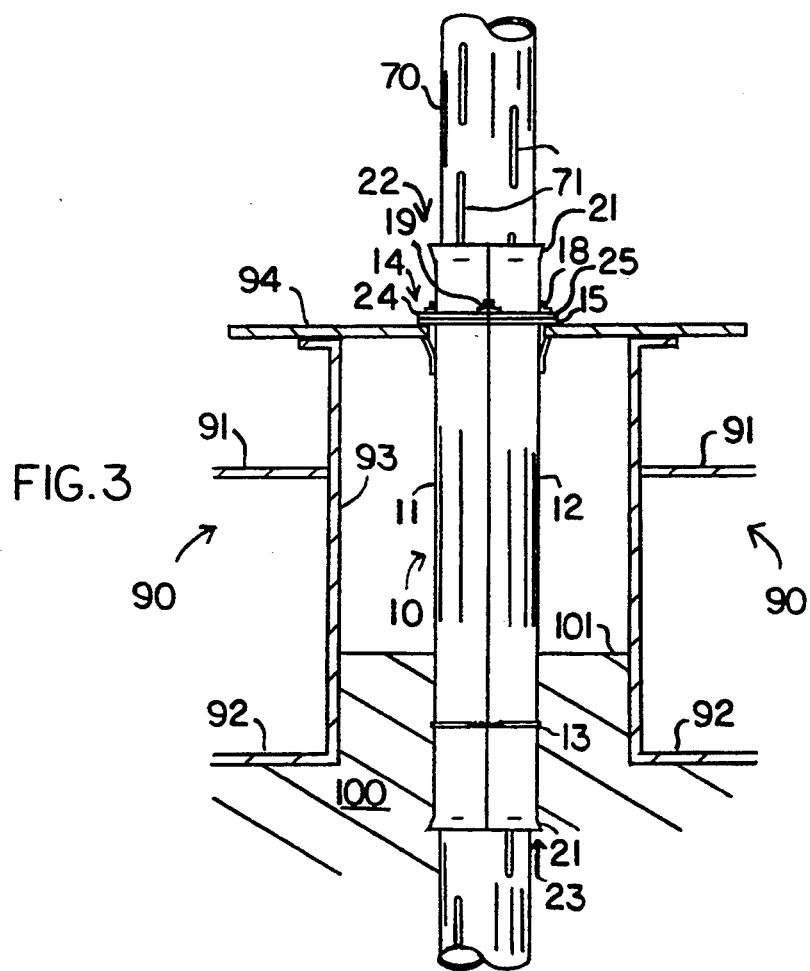
FIG. 3 is a view similar to FIG. 1 but with the invention and gauge pole shown exposed.

The invention mainly comprises a tubular sleeve 10 formed by connecting two half sleeve members 11 and 12, means 13 to join the two half sleeves 11 and 12 together, an annular sealing collar 14 formed of two half rings 24 and 25 joined by connecting means 19, an annular gasket 15, and fastening means 20 to connect the sleeve 10 to a sliding cover 94, as shown in FIG. 2. Half sleeve members 11 and 12 are formed of a thin sheet metal or similar material and are sized to closely encircle gauge pole 70 when connected to form the tubular sleeve 10. Sleeve 10 has a solid wall impermeable to liquid 100 and liquid vapor. The length of sleeve 10 is determined by the depth of the floating roof 90. The upper end 22 of sleeve 10 extends above the upper roof surface 91, well 93 and sliding cover 94, and the lower end 23 of sleeve 10 extends downward into well 93 and through the liquid surface 71, as shown in FIG. 3. The two half sleeve members 11 and 12 are held together along the lower portion by any suitable joining means 13, such as for example a circular band spring. Preferably, the sleeve joining means 13 allow for a minimal amount of expansion should imperfections in the surface of the gauge pole 70 be encountered as the floating roof 90 rises or falls. The half sleeve members 11 and 12 are held together along their upper portion by sealing collar 14, which comprises two sealing collar half rings 24 and 25 connected together by connecting means 19, which can be any suitable fastening means but preferably incorporates a spring to allow for minimal expansion in the case of gauge pole 70 imperfections as described above. Preferably, sleeve 10 also incorporates flared members 21 on both upper end 22 and lower end 23 which allow the sleeve 10 to more easily pass over imperfections in the gauge pole 70. Sealing collar 14 further incorporates a gasket member 15 which is positioned between the sealing collar 14 and the sliding cover 94. Sleeve fastening means 20 are used to attach the sleeve 10 to the sliding cover 94, such that the sleeve is fixedly connected to the sliding cover 94 and thus will move vertically along the gauge pole 70 with the floating roof 90. Sleeve fastening means may comprise spring tabs 16 attached to the sleeve 10, spring tabs 16 being designed to allow the sleeve to be inserted into the sliding cover aperture 95 from the top, with the tabs 16 spreading to lock against the sliding cover 94 to prevent the sleeve 10 from being removed upwardly, as shown in FIG. 4. Locking screws 17 mounted on the sleeve 10 by brackets 18 above the spring tabs 16 are used to tighten the sealing collar 14 and gasket 15 against the sliding cover 94 and spring tabs 16, thereby locking the sleeve 10 onto the sliding cover 94 and compressing gasket 15 to create a vapor impermeable seal.

A major advantage of the invention is that it can be easily installed on existing tank structures. The two half sleeve members 11 and 12 are connected around the gauge pole 70 by joining member 13 to form sleeve 10. This assembly is then pushed down through the sliding cover aperture 95, and roof plate aperture 97 if present, until the spring tabs 16 are beneath the sliding cover 94 and abutting its underside. The sleeve 10 now extends into the liquid 100 as shown in FIG. 3. The two sealing collar half rings 24 and 25 are now joined around sleeve 10 beneath locking screws 17 using sealing collar connection means 19 to form an annular seal with gasket 15 positioned between the sealing collar 14 and the sliding cover 94. The locking screws 17 are tightened to compress the gasket 15 and force spring tabs 16 against the underside of sliding cover 94, thereby connecting the sleeve 10 to the sliding cover 94. In this manner the two main avenues of vapor loss in existing systems are now sealed. The sealing collar 14 seals directly to the external wall of sleeve 10 and the gasket 15 seals the joint between the sealing collar 14 and sliding cover 94. Thus no vapors can escape from well 93 through sliding cover aperture 95. Secondly, the sleeve 10, by extending from beneath the surface 101 of liquid 100 to above the sliding cover 94, closes all the exposed slots 71 in well 93 so that no vapor can escape from well 93 through the interior of gauge pole 70. When used in conjunction with the known internal floating seals used to close the interior of the gauge pole 70, vapor losses are reduced 98 to 99 percent over the structures now in use.

It is understood that equivalents and substitutions to the elements set forth above may be obvious to those skilled in the art, and the above examples are by way of illustration only. The true scope and definition of the invention is to be as set forth in the following claims.

I claim:

1. A seal apparatus in combination with a slotted gauge pole extending through a well in a floating roof of a large liquid storage tank, the well being covered by a sliding cover having an aperture to receive the gauge pole, the seal comprising:
   (A) a tubular sleeve member encircling the slotted gauge pole and extending above the sliding cover and below the well into the liquid;
   (B) a sealing collar connected to said sleeve member above said sliding cover, said sealing collar having a gasket compressed against said sliding cover to seal the aperture in said sliding cover;
   (C) means to fasten said sleeve member to said sliding cover.

2. The apparatus of claim 1, where said sleeve member is comprised of two half-sleeve members joined around said gauge pole by a sleeve joining member to form said sleeve member.

3. The apparatus of claim 2, where said sleeve joining member is a band spring encircling said half-sleeve members.

4. The apparatus of claim 1, where said means to fasten said sleeve member to said sliding collar comprise spring tabs mounted to said sleeve member below said sliding cover and locking screws mounted to said sleeve member above said sliding cover, said locking screws forcing said spring tabs against said sliding cover when tightened.

5. The apparatus of claim 1, where said sleeve member comprises flared ends.

* * * * *